Aug. 6, 1940.                H. KOTHER                2,210,675
                        MULTIPOWER DRIVING VEHICLE
                         Filed Sept. 16, 1937
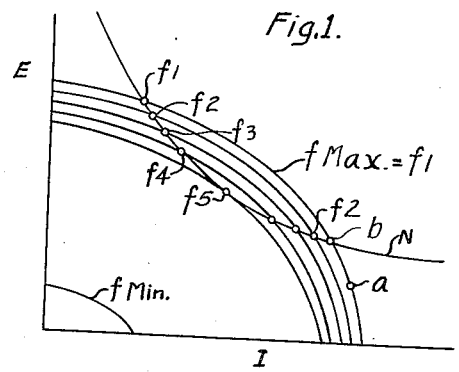
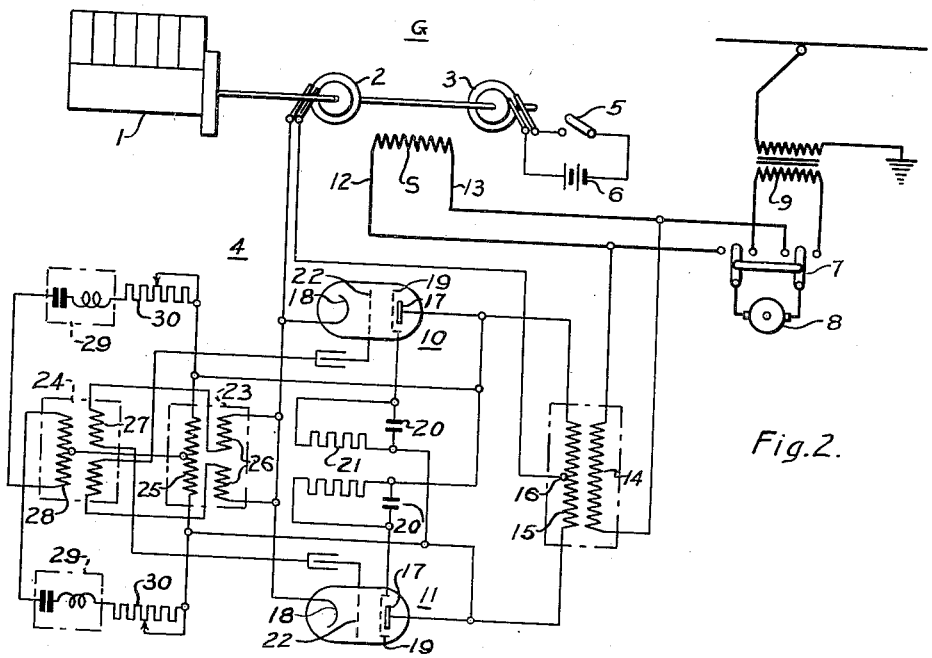
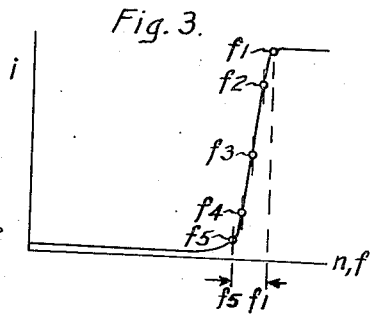
WITNESSES:
INVENTOR
Hans Kother.
BY
ATTORNEY Patented Aug. 6, 1940

2,210,675

UNITED STATES PATENT OFFICE 2,210,675

MULTIPOWER DRIVING VEHICLE

Hans Kother, Berlin-Siemensstadt, Germany, assignor to Westinghouse Electric & Manufacturing Company, East Pittsburgh, Pa., a corporation of Pennsylvania Application September 16, 1937, Serial No. 164,162
In Germany September 18, 1936

7 Claims. (Cl. 290—17)

The invention relates to multipower driving vehicles and has for its object the provision of such a vehicle which has many advantages over the other vehicles known heretofore. Thus, in the present vehicle, by using any desired generator in connection with a determined excitation as proposed by the invention, I dispense with a special auxiliary regulating device for the power delivered by the Diesel motor. For this reason, such a vehicle is superior to the known constructions since not only may it be driven over ordinary railroad tracks but also over electric railway tracks, in which the energy for moving the vehicle is derived from the current supply device available. Further, it is to be understood that this vehicle is not limited in accordance with the selection of electrical equipment to networks of determined frequency but under certain circumstances may be driven on networks of different frequencies; thus for example, on a network with a frequency of 50 cycles or with a frequency of 16⅔ cycles.

For a fuller understanding of the nature and objects of the invention, reference may be had to the following detailed description, taken in conjunction with the accompanying drawing in which:

Figure 1 is a view of curves showing the operating characteristics of an alternating current generator;

Fig. 2 is a diagrammatic view of a power system embodying the invention, and

Fig. 3 is a view of curves showing the operating characteristics of a frequency dependent regulator.

In accordance with the present invention, a Diesel motor or engine connected in driving relation with a direct current or a single or polyphase alternating-current generator is provided on the plural power driving vehicle. This driving arrangement serves for supplying current to the alternating-current driving motors of the vehicle which, under certain circumstances in passing over paths fed by power networks after switching over or switching off the Diesel driving set, may be fed directly from the network.

As mentioned, the vehicle may be equipped with any desired generators; thus for example, with a direct-current generator or with a single or polyphase alternating-current generator which supply power to alternating-current motors, preferably of the commutator type, which drive the vehicle so that these motors may be driven either with direct current or with alternating current of different frequencies; for example, 16⅔ or 50 cycles.

The use of an alternating-current generator offers a considerable advantage with reference to the applicable Diesel-driven generators for Diesel-electric drives insofar as an additional exciting machine for the regulation of the power delivery of the Diesel motor may be dispensed with with more facility. In an alternating-current generator by reason of the inductance of the generator and its high armature reaction, the potential delivered by it varies in dependence upon the armature current in accordance with a characteristic which approximately simulates that of a direct-current generator equipped with a heavy counter-connected winding. However, a direct-current generator is constructed with such a winding at a considerable increase in weight, so that by the use of the alternating-current generator a considerable economy in weight is attained.

The form of the characteristic of the alternating current generator, as can be seen from Fig. 1, is influenced principally by the excitation current present at the instantaneous frequencies, for example, frequency $f1$ to $f5$ of the generator. An equal power curve N drawn through these characteristics shows also the peculiar variation of the direct-current counter-connection Diesel driving set. The characteristic lines according to Fig. 1 show that, even by applying only a normal alternating-current generator in connection with a frequency or rotational speed dependent regulating device, the possibility is available of attaining for the Diesel motor or engine the important curve of uniformly delivered power.

It has been previously shown that in the system according to the invention a definite excitation, namely, a frequency or rotational speed dependent excitation is utilized. The use of this special excitation offers the further advantage that each generator provided in the driving set (regardless of whether it is direct current or alternating current) may operate with self-excitation. In applying an alternating-current generator, it may be preferably self-excited by connecting the frequency dependent regulator directly to the operating windings of the current producer. An available direct-current generator may also be self-excited in dependence upon frequency by feeding its excitation through a frequency dependent regulator which, in turn, is connected to special slip rings of the generator carrying alternating current.

Further it is also conceivable that the frequency dependent regulator may be fed, for example, through a special polyphase excited machine or through a machine of weak saturation, which under certain circumstances, may be the exciting machine and the regulator at the same time.

The invention will be explained more in detail with reference to an embodiment thereof and particularly one for an arrangement with an alternating-current generator. The Diesel motor identified by the numeral 1 in Fig. 2 drives the rotor of the alternating-current generator G which, for example, is equipped with two exciting windings. The first exciting winding is supplied with exciting current dependent on the rotational speed or the frequency through the slip rings 2, which is delivered by a rotational speed or frequency dependent regulator 4, regardless of what type. As can be seen in the present case, the frequency dependent regulator 4 is fed from the alternating-current windings of the generator G and delivers currents of different magnitudes in accordance with supplied frequency, which is rectified in the regulator however, to the first exciting winding of the alternating-current generator. The second exciting winding is connected through the slip rings 3 after the closing of the switch 5 to the exciting battery 6. The excitation of this winding, therefore, remains independent of the rotational number or the speed.

It should be remembered that the generator need in no way have two exciting windings but will operate satisfactorily with one winding if the battery and exciting potential are connected in series.

For the case in which the vehicle passes on a path fed by a network, the Diesel electric driving set may be disconnected with the aid of a switching-over device 7 and the vehicle motor 8 connected to the transformer 9. The vehicle then derives the energy necessary for its motion from the network in question. As the transformer is designed for 16⅔ cycles and the motor for 50 cycles, the vehicle may be driven as well by a network of 50 cycles as by one with 16⅔ cycles. For the case in which the transformer is designed only for 50 cycles, the use of the vehicle is limited to networks of this frequency.

In the following the effect of the two excitations on the alternating-current generator G will be explained more in detail. If a frequency dependent regulator with a characteristic line as shown in Fig. 3 is utilized; Fig. 3 representing the variation of the exciting current in dependence upon the rotation number $n$ or the frequency $f$, then this regulator should have practically no effect on the excitation of the alternating-current generator until a predetermined rotational number or frequency, so that up to this predetermined rotational number the excitation of the generator is supplied by the battery 6. The excitation caused by the battery produces a definite field and the potential produced thereby varies somewhat as the curve for $f$ minimum in Fig. 1. This excitation is sufficient to set the vehicle into motion or to drive it at a low speed. If the rotational number or speed of the Diesel motor then rises, the complete exciting current is supplied to the generator G through the slip rings 2 from the frequency dependent regulator 4, as can be seen from Fig. 3, with increasing frequency within a range of, for example, $f1$ to $f5$ equal to a half cycle. The latter then operates, for example, at a point $a$, lying on the characteristic line for $f$ maximum. At the operating point $b$ of the same characteristic line, the power delivered by the Diesel motor is exactly equal to its nominal power.

Assume that the generator operates further on the characteristic line $f$ maximum; in such a case, the Diesel motor is overloaded. The smallest overload, however, decreases at once its rotational number or speed so that for a somewhat smaller frequency $f2$ the exciting current is decreased to such an extent, as can be seen from Fig. 3, that the generator now operates on characteristic line $f2$ with corresponding smaller excitation. This automatic regulation is effective until the generator again operates on the original $f$ maximum characteristic line.

As frequency dependent regulators, one or more joined, oscillation circuits may be utilized; these circuits are tuned to a definite frequency and accordingly only pass current below a predetermined rotational number. This oscillation circuit feeds either a simple gridless tube rectifier or a dry rectifier which supplies the exciting field of the machine with rectified alternating current directly or through an amplifier. With rising frequency, the potential of the rectifier increases in this arrangement and this delivers a rising exciting current (anode control) in accordance with Fig. 3. In such a regulator, the oscillation circuit must be dimensioned for power if it should deliver the full exciting power. If this is to be avoided, then instead of simple rectifier tubes, those with grid control should be utilized to attain the same frequency dependent regulation. Besides, a self-exciting machine, preferably with weak saturation may also be used as a frequency dependent regulator; such a machine, in general, does not manifest so strong a frequency dependence.

The essential parts of the regulating outfit 4 herein illustrated, whose functioning depends on the frequency, are two oscillating circuits which are tuned to a definite frequency. The oscillating circuit influences the controlling grids of rectifier tubes which are used to supply the direct current for exciting the generator, for instance, through the collector rings 2 (see Fig. 2 of the drawing).

In Fig. 2 of the drawing, reference characters 10 and 11 designate two discharge tubes, each provided with two grids; these two tubes, which operate in phase-opposition, rectify and control the voltage produced by the alternating-current generator G, the rectified and controlled voltage being applied to one of the field windings of the generator through collector rings 2. By means of the connecting wires 12 and 13, the voltage produced by the alternating-current generator G is first applied to a transformer 14 whose secondary winding 15 has a centrally located tap 16. This tap, which constitutes the negative terminal, is connected to one of the collector rings 2 of the field system of the generator. The two terminals of the secondary winding 15 (i. e., the two ends of this winding) are connected to the anodes 17 of the two tubes 10 and 11. The cathodes 18 of these tubes are connected together; constituting the positive terminal, they are further connected to the second collector ring 2 of the field system of the generator. The protective grids 19 are connected in accordance with standard practice, to a constant voltage source; for instance: they may be connected through a capacitor 20, which is shunted by a resistor 21, to the anode of the other tube.

There have been provided two auxiliary transformers 23 and 24 for the purpose of influencing the controlling grids 22 in accordance with the desired characteristics of regulation. The primary winding 25 of the transformer 23 is connected in parallel with the secondary winding 15 of the main transformer 14. The secondary winding 26 is in two sections which are each connected in series with a corresponding section of the secondary winding 27 of the transformer 24, and each of the two series-combinations thus obtained is connected between the positive terminal of the system (i. e., the common cathode-terminal) and the controlling grid of one of the tubes.

The primary winding 28 of the transformer 24 has a centrally located tap which is connected to a centrally located tap of the winding 25 of the transformer 23. The terminals at the ends of the winding 28, which are in phase-opposition, are each connected to an oscillating circuit 29, and each oscillating circuit 29 is connected through an adjustable series resistor 30 to the anode terminal of a tube.

In principle it is possible to combine the two transformers 23 and 24 into one single transformer having three windings, in which case the series-connected winding-halves 26 and 27 will coincide. However, if this is done, due consideration should be given to the strong flow of equalizing current, as a consequence of which the cross-sections of the windings will have to be made relatively large. Eventually a three-winding transformer provided for this purpose can be designed with a third core-leg for the purpose of making possible an equalization of the flux.

The alternating current which is induced in the generator and supplied to the transformer 14 has a frequency which is proportional to the rotational speed of the Diesel engine. The oscillating circuits are tuned to a frequency which is slightly higher than the frequency corresponding to the maximum rotational speed. The presence of the series resistors 30 makes it possible to decrease somewhat the steepness of the resonance curve and to secure in this manner a more stable operating characteristic. But on the other hand, the ohmic resistance must be held so low that the regulating outfit will respond in the desired manner already at relatively small deviations of the speed from the nominal value.

The voltage applied to the primary winding of the auxiliary transformer 23 has the magnitude and the frequency of the voltage produced by the generator. The frequency of the voltage applied to the transformer 24 also depends on that of the voltage of the generator, but the magnitude of this voltage is modified by the connection in series of the resonance circuits 29 with the primary of this transformer. Now the secondary windings 26 and 27 are connected in series between the plus terminal of the system and the grids 22 in such a manner that the difference of the voltages induced in these windings is the active voltage applied to said grids. At the same time, the ratios of transformation of these transformers have been so chosen that at the normal rotational speed, that is, at a speed slightly lower than the speed at which the frequency has the resonance value, the ignition points of the tubes are shifted to an extent corresponding to from 60% to 70% utilization of the tubes, a utilization at which the field current has the required value.

As soon as the rotational speed of the prime mover, i. e., the speed of the Diesel engine, changes slightly, there will be produced a change in generator frequency which will cause a change in the impedances of the resonance circuits that are in series with the winding 28, and, as a consequence thereof, the voltage drop in these circuits will change. The result is that if the frequency increases, the voltage drop becomes smaller; hence the voltage difference, which is applied to the grids 22, diminishes in this case, and the ignition points are shifted towards a higher utilization of the tubes; in other words, the field current increases. Conversely, if the rotational speed drops, due, for instance, to an overloading of the prime mover, the impedances of the resonance circuits increase, and for this reason the grid voltages increase; as a result, the utilization of the tubes is lowered, and the reduction in field current causes the generator G to reduce its output, so that the Diesel engine can resume its initial speed because the load carried by this engine is reduced somewhat. It is always possible to choose the constants of the resonance circuits in such a manner that, depending on the prevailing conditions, the regulating outfit will operate within a range comprising the most favorable portion of the resonance curve.

In principle, the arrangement can remain the same if the generator is of the direct-current type. But in this instance it is necessary to provide an additional alternating-current exciter which will produce an alternating current that depends on the rotational speed.

Since many modifications may be made in the apparatus and arrangement of parts without departing from the spirit of my invention, I do not wish to be limited other than by the scope of the appended claims.

I claim as my invention:

1. In a plural-power driving vehicle, in combination, an electric motor, a generator for supplying current to said motor, a Diesel engine for driving the generator, and means for exciting said generator from a source which is dependent on the frequency of the generator and a source which is independent thereof, whereby the Diesel engine is regulated for uniform power delivery.

2. In a plural-power driving vehicle, in combination, an electric motor, a generator for supplying current to said motor, a Diesel engine for driving the generator, and means for exciting said generator comprising a source of uniform potential which is independent of the rotational speed of the generator and a frequency dependent regulator which is dependent on the speed of the generator, whereby the Diesel engine is regulated for uniform power delivery.

3. In a plural-power driving vehicle, in combination, an electric motor, a generator for supplying current to said motor, a Diesel engine for driving the generator, said generator having two excitation windings, and means for energizing one of said windings independently of the rotational speed of the generator and the other winding according to the frequency of the generator, whereby the Diesel engine is regulated for uniform power delivery.

4. In a plural-power driving vehicle, in combination, an electric motor, a generator for supplying current to said motor, a Diesel engine for driving the generator, said generator having two excitation windings, one of said windings being energized from a source of uniform potential and the other winding being energized from the armature of the generator through a regulator which is dependent on the frequency of the generator, whereby the Diesel engine is regulated for uniform power delivery.

5. In a plural-power driving vehicle, in combination, an electric motor, a generator or supplying current to said motor, a Diesel engine for driving the generator, said generator having two excitation windings, one of said windings being energized from a source of uniform potential and the other winding being energized from the armature of the generator through oscillation circuits cooperating with rectifying devices to regulate the excitation current in accordance with the frequency of the armature current, whereby the Diesel engine is regulated for uniform power delivery.

6. In a vehicle, in combination, an electric motor for driving the vehicle, a generator for supplying current to the motor, an engine for driving the generator, and means for jointly exciting said generator from a source which is dependent on the frequency of the generator and a source which is independent thereof, whereby the engine is regulated for uniform power delivery.

7. In a vehicle, in combination, an alternating-current electric motor for driving the vehicle, an alternating-current generator for supplying current to said motor, an engine for driving the generator, and means for exciting said generator comprising a source of uniform potential which is independent of the rotational speed of the generator and a frequency responsive regulator which is dependent on the speed of the generator, whereby the engine is regulated for uniform power delivery.

HANS KOTHER.